(12) United States Patent
Dayon

(10) Patent No.: US 8,751,579 B1
(45) Date of Patent: Jun. 10, 2014

(54) METHOD AND SYSTEM OF MAINTAINING A BROWSER IN A DESIGN APPLICATION WORKFLOW

(75) Inventor: Alexandre Dayon, Paris (FR)

(73) Assignee: salesforce.com, inc., San Francisco, CA (US)

( * ) Notice: Subject to any disclaimer, the term of this patent is extended or adjusted under 35 U.S.C. 154(b) by 1619 days.

(21) Appl. No.: 11/366,920

(22) Filed: Mar. 2, 2006

(51) Int. Cl.
*G06F 15/16* (2006.01)

(52) U.S. Cl.
USPC ........... 709/205; 709/201; 709/203; 709/217; 709/223; 709/225; 370/310; 370/352; 370/229

(58) Field of Classification Search
USPC ......... 709/217–219, 223–225, 235, 200–206; 370/310, 352, 238, 229, 235
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,023,722 A * | 2/2000 | Colyer | 709/201 |
| 6,092,083 A | 7/2000 | Brodersen et al. | |
| 6,141,793 A * | 10/2000 | Bryant et al. | 717/115 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,289,462 B1 * | 9/2001 | McNabb et al. | 726/21 |
| 6,295,530 B1 | 9/2001 | Ritchie et al. | |
| 6,314,458 B1 * | 11/2001 | Steele et al. | 709/219 |
| 6,324,568 B1 | 11/2001 | Diec et al. | |
| 6,324,693 B1 | 11/2001 | Brodersen et al. | |
| 6,336,135 B1 * | 1/2002 | Niblett et al. | 709/215 |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,523,022 B1 * | 2/2003 | Hobbs | 707/3 |
| 6,535,909 B1 | 3/2003 | Rust | |
| 6,549,908 B1 | 4/2003 | Loomans | |

(Continued)

*Primary Examiner* — Wing F Chan
*Assistant Examiner* — Benjamin M Thieu
(74) *Attorney, Agent, or Firm* — Ingrassia Fisher & Lorenz, P.C.

(57) ABSTRACT

A system for maintaining consistent workflow is disclosed. The system includes a browser, a local application, a server application, and protocol logic configured to coordinate interactions between the local application and the server application and control the browser. Upon detecting the local application becoming active, the protocol logic freezes the browser until an event with respect to the local application is detected. The protocol logic is further configured to utilize a plurality of browser network parameters shared with a number of other protocols in order to ensure that the protocol logic is compatible with different network security devices.

17 Claims, 6 Drawing Sheets

(56) References Cited

U.S. PATENT DOCUMENTS

| | | |
|---|---|---|
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,146 B1 * | 8/2003 | Slotznick ............... 709/200 |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,778,989 B2 * | 8/2004 | Bates et al. ............... 707/10 |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,845,408 B1 * | 1/2005 | Lemke et al. ............... 710/18 |
| 6,850,895 B2 | 2/2005 | Brodersen et al. |
| 6,850,949 B2 | 2/2005 | Warner et al. |
| 6,901,425 B1 * | 5/2005 | Dykes et al. ............... 709/203 |
| 7,210,101 B2 * | 4/2007 | Terashima et al. ............ 715/234 |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0095454 A1 * | 7/2002 | Reed et al. ............... 709/201 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0170071 A1 * | 11/2002 | Parnell et al. ............... 725/130 |
| 2003/0004971 A1 | 1/2003 | Gong |
| 2003/0009460 A1 * | 1/2003 | Bates et al. ............... 707/10 |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0145056 A1 * | 7/2003 | Fujisawa et al. ............... 709/205 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0168030 A1 * | 8/2004 | Traversat et al. ............... 711/133 |
| 2004/0185840 A1 * | 9/2004 | Sumino et al. ............... 455/418 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0026664 A1 * | 2/2006 | Pierre et al. ............... 725/134 |
| 2007/0050449 A1 * | 3/2007 | Beck ............... 709/204 |
| 2007/0260702 A1 * | 11/2007 | Richardson et al. ............ 709/217 |

* cited by examiner

METHOD AND SYSTEM OF MAINTAINING A BROWSER IN A DESIGN APPLICATION WORKFLOW

CROSS-REFERENCE(S) TO RELATED APPLICATION(S)

Not Applicable.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

The present invention generally relates to design application workflow, and in particular to methods and systems for maintaining a browser in a design application workflow.

Under conventional systems, end-user workstations like Windows PCs provide the users with multiple applications to access, edit and/or modify different types of documents and data formats.

When building or designing an application, application designers define workflows and application logic to describe the possible actions of a user on data models. Current Internet browser technologies do not permit mixing browser-based workflow with local workstation application workflow. Indeed, while browsers are capable of launching other applications to view and/or edit data objects (such as a document or a video clip), this behavior is "fire and forget" meaning that the browser behavior is not dependent on other application behavior. In other words, at any point in time, a user can go back to the browser from an opened application, close the browser or switch to another application (such as a website), making any feedback from the opened application unpredictable. For example, a user can use the Internet Explorer to start the Word application to edit an HTML file. But once the HTML file is opened in the Word application, the user can freely switch back to the Internet Explorer and continue to browse the Web without regard to the current condition of the Word application. This makes it impossible for an application designer to enforce and design application workflow mixing browser and local applications.

Hence, it would be desirable to provide methods and systems that are capable of, amongst other things, mixing browser and local applications in a design application workflow.

SUMMARY OF THE INVENTION

A system for maintaining consistent workflow is disclosed. In one embodiment, the system includes a browser, a local application, a server application, and protocol logic configured to coordinate interactions between the local application and the server application and control the browser. Upon detecting the local application becoming active, the protocol logic freezes the browser until an event with respect to the local application is detected. The protocol logic is further configured to utilize a plurality of browser network parameters shared with a number of other protocols in order to ensure that the protocol logic is compatible with different network security devices.

In another embodiment, a system for maintaining consistent workflow includes a browser, a local application, a server application, and protocol logic configured to synchronize the behavior amongst the browser, the local application and the server application. Upon detecting a first event with respect to the local application, the protocol logic freezes the browser until a second event with respect to the local application is detected. The protocol logic is further configured to utilize a plurality of browser network parameters shared with a plurality of other protocols in order to ensure that the protocol logic is compatible with different network security devices.

In one aspect, a method of maintaining consistent workflow between a browser and an application is disclosed. According to the method, the browser is activated to establish a browser session. Launch of the application is then initiated. Upon detecting that the application is to be launched, the browser is frozen until an event with respect to the application is detected. A number of browser network parameters shared with a number of other protocols may be used in order to ensure compatibility with different network security devices.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DETAILED DESCRIPTION OF SPECIFIC EMBODIMENTS

One or more embodiments of the present invention will now be described. In one embodiment, the present invention is provided in the form of a browser protocol, similar to other network protocols like FTP, HTTP or MAILTO:. The protocol by enabling state and data communication between the browser and other local workstation application solves the problem of workflow implementation for an application designer. During the usage of this protocol, the browser is able to keep its session alive, since this is compatible with URL session management and cookies session management. The protocol is not restricted to any type of applications or documents.

Figure 1:
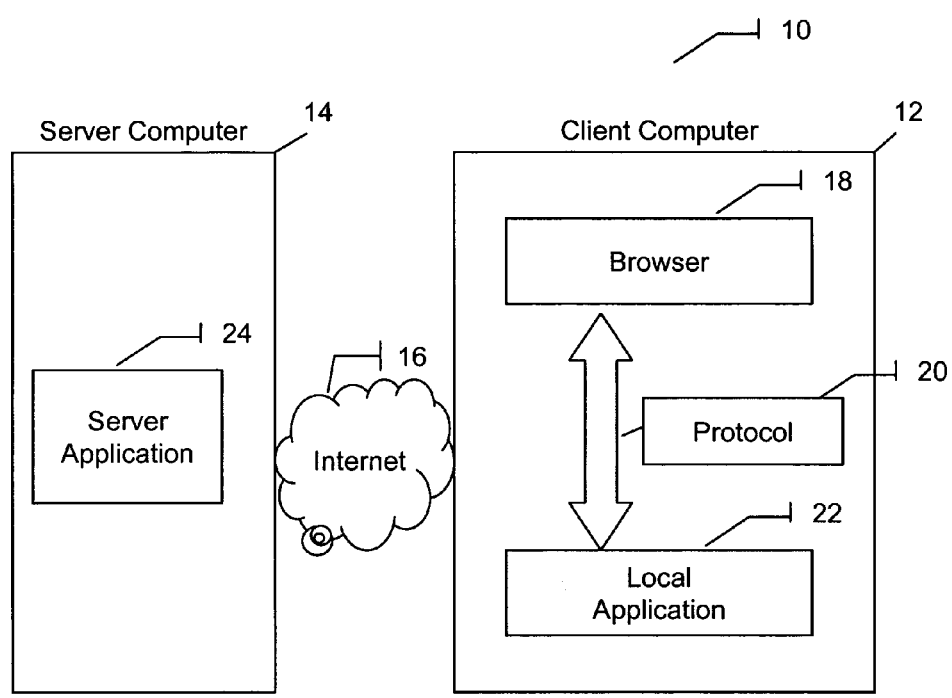
FIG. 1 is a simplified schematic diagram illustrating one embodiment of the present invention.

FIG. 1 illustrates one embodiment of the present invention. The system 10 includes a client computer 12 and a server computer 14. The client computer 12 and the server computer may communicate via a computer network, such as, the Internet 16. The client computer 12 and the server computer 14 may include, for example, personal computers, workstations and any other types of computing devices.

The client computer 12 may further include a browser 18, a local application 22, a protocol 20 implemented in the form of software. The server computer 14 may further include a server application 24.

The protocol 20 is used to control or coordinate the interactions amongst the browser 18, the local application 22 and the server application 24, as will be further explained below.

In one embodiment, the browser 18, the local application 22, the server application 24 and the protocol 20 collectively provide a certain application or functionality, such as, a document retrieval/editing system. For example, the local application 22 may coordinate with the server application 24 to retrieve document(s) from the server computer 14 by using the browser 18 and the protocol 20. The protocol 20 may be configured to perform the following functions including, for example, starting or launching another application from a browser, freezing the browser, monitoring the launched application, keeping the browser session alive and closing the launched application.

Figure 2:
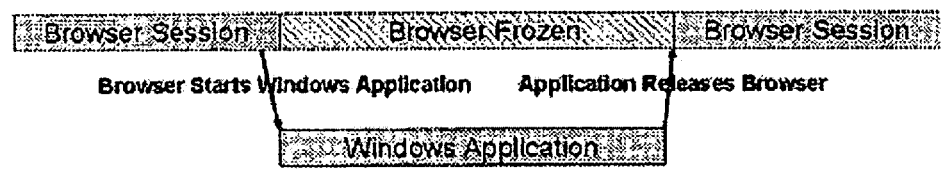
FIG. 2 is a simplified schematic diagram illustrating the status of a browser and a local application using a protocol according to one embodiment of the present invention.

FIG. 2 illustrates the status of the browser 18 and the local application 22 using the protocol 20 according to one embodiment of the present invention. As shown in FIG. 2, the browser 18 is initially launched by a user to establish a browser session. Upon receiving an indication from the user that the local application 22 is to be launched, the protocol 20 operating with the browser 18 launches the local application 22. The local application 22 may then interact with the server application 24 to perform certain functions. Upon launching the local application 22, the protocol 20 also freezes the browser 18. The browser 18 is frozen in that the browser session is still alive but no direct user action with respect to the browser 18 is permitted. In other words, the user cannot interact with the browser 18 directly. For example, the browser 18 is prevented from reacting to user-initiated events, such as, a mouse click on a link or a close menu command. However, the browser 18 may continue to interact with other applications, such as the local application 22. The protocol 20 may cause the browser 18 to be released in response to certain events and/or conditions, i.e., the browser 18 may return to an active state from the frozen state. Such events and/or conditions may be triggered by the local application 22. For example, when the local application 22 is deactivated, the protocol 20 may release the browser 18. The browser session becomes active again and direct user action with respect to the browser 18 is permitted.

FIGS. 3A-D show an example illustrating the use of the system 10. The system 10 is used in the context of a document publishing service whereby users are given the right to access and/or edit documents. A number of documents are stored on the server computer 14 and made available over the Internet 16 for access and edit. The documents may be generated by various applications using different formats, such as, Excel, Word, HTML, etc.

Figure 3A:
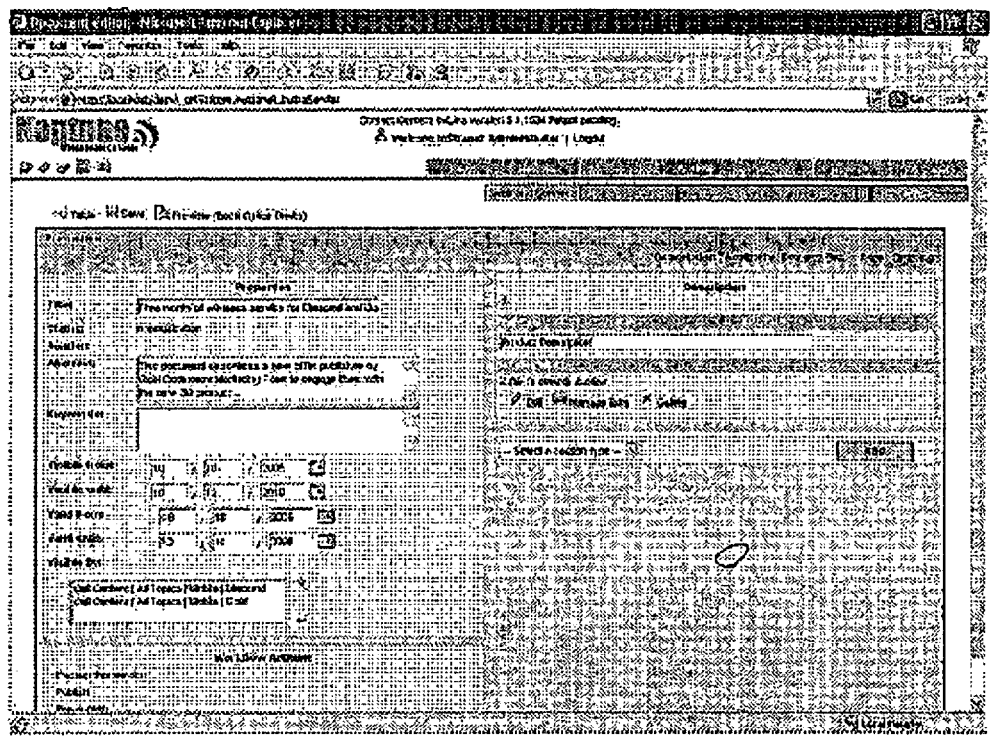
FIGS. 3A-D are simplified schematic diagram illustrating an example of use according to one embodiment of the present invention.

As shown in FIG. 3A, a user may activate the browser 18 to establish a browser session. The browser session allows the user to reach a website, vis-à-vis, the server computer 14, via the Internet 16. The website is coupled to the server computer 14 where the desired document(s) are stored. In order to access the website to retrieve the desired document(s), the user may need to provide the proper identification and access information.

Figure 3B:
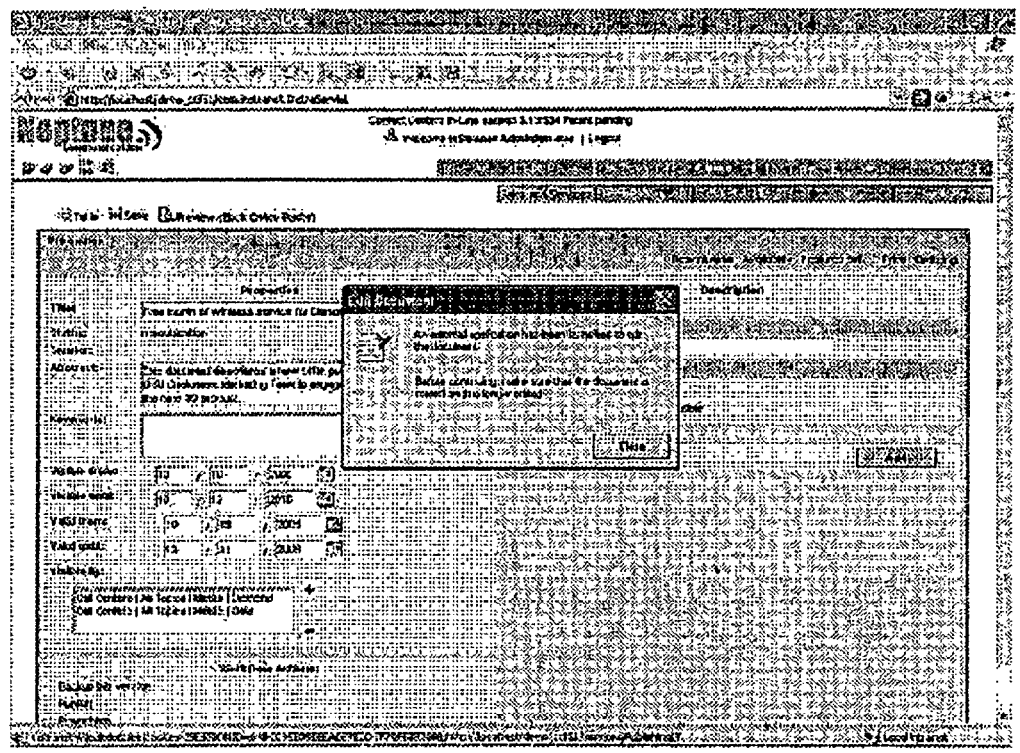

In FIG. 3B, the user clicks on an edit link in order to retrieve and edit a desired document. Upon detecting the user clicking on the edit link, the protocol 20 activates the local application 22 to allow the user to retrieve and edit the document. For example, the local application 22 may include a Word or Excel application. The local application 22 and the server application 24 may cooperate with each other to achieve the desired functions.

Figure 3C:
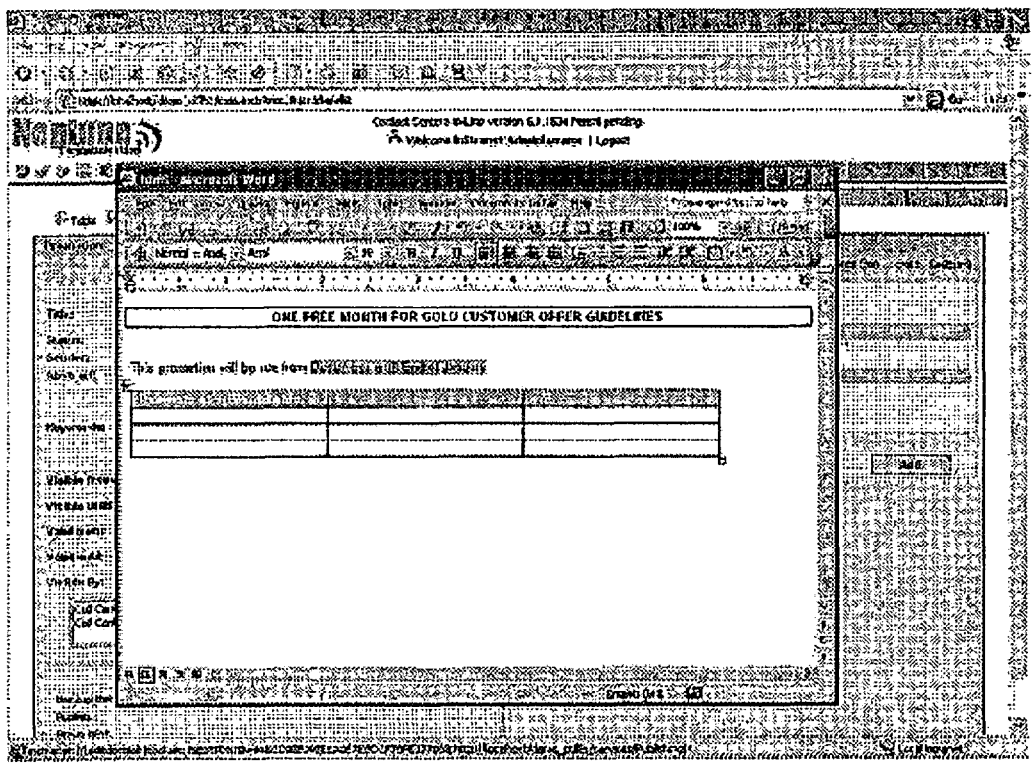

In FIG. 3C, the local application 22 is launched by the protocol 20, as indicated by the new window. The local application 22 allows the user to access and/or edit the document. The protocol 20, however, causes the browser 18 to be frozen in the background. In other words, the user is no longer able to interact with the browser 18, such as, using the browser 18 to access other website(s).

Figure 3D:
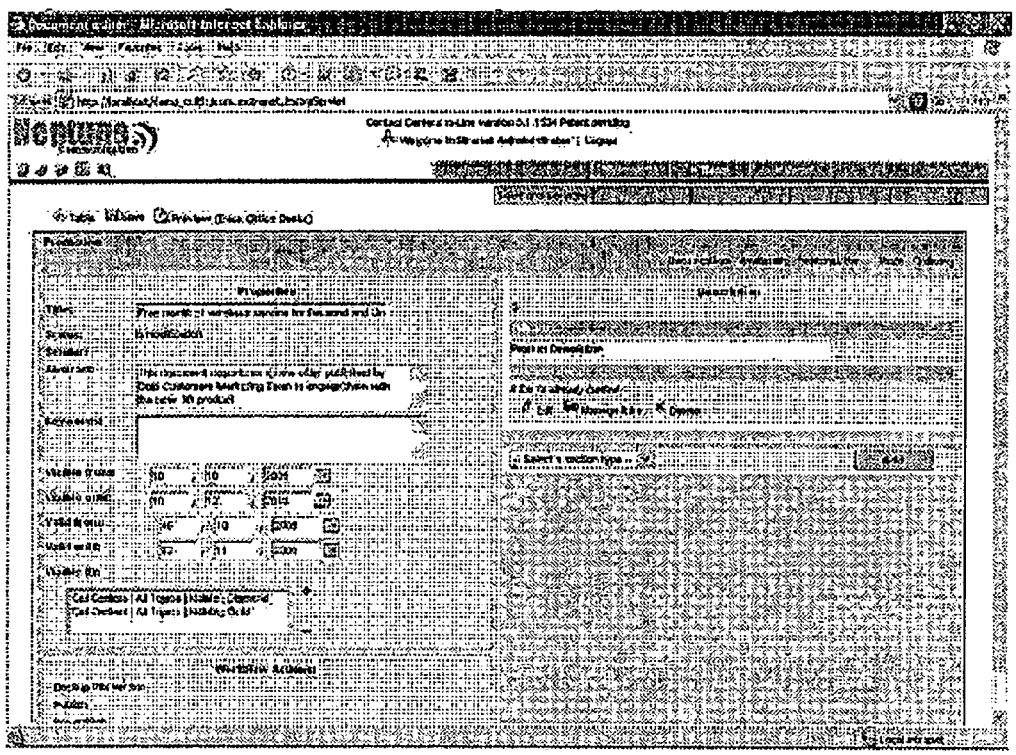

In FIG. 3D, once the user is finished with accessing and/or editing the document, the user closes the local application 22. Upon detecting that the local application 22 has been closed, the protocol 20 causes the browser 18 to be released. The user once again is able to use the browser 18 to perform other functions, such as, requesting the website to retrieve another document from the server computer 14.

It should be noted that the protocol 20 is able to work with a number of different applications, such as, the local application 22. Furthermore, the protocol 20 is independent of an application, i.e., the protocol 20 is able to work with any type of application, such as, a document application, an email application, etc. Moreover, the protocol 20 may be configured to work with different types of browsers, such as, Internet Explorer and others. In addition, the protocol 20 may utilize browser network parameters shared with other protocols (such as, FTP, LDAP, MAILTO, NEWS) to ensure that the protocol 20 is compatible with different network security devices, such as, firewalls.

Use of the protocol 20 may provide a number of advantages and/or benefits. For example, since the protocol 20 is configured to control the behavior of the browser 18 and the local application 22, the protocol 20 enables the behavior of the browser 18 and the local application 22 to be synchronized. Consequently, workflow control can be better managed. This is particularly advantageous because as more and more applications have become web-based, the use of the protocol 20 allows consistency between a browser and a web-based application to be maintained more effectively.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided for purposes of illustration and description to enable any person skilled in the art to make or use the present invention. It is not intended to be exhaustive or to limit the invention to the precise form disclosed. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A system for maintaining consistent workflow, the system comprising:
   a processor; and
   a machine-readable storage medium including instructions that, when executed by the processor, cause the processor to implement a browser, a local application, and protocol logic, wherein the instructions further cause the protocol logic to:
      establish a line of communication between the local application and the browser;
      control the browser;
      upon detecting the local application becoming active, freeze the browser until an event with respect to the local application is detected; and
      utilize a plurality of browser network parameters shared with a plurality of other protocols in order to ensure that the protocol logic is compatible with different network security devices,
   wherein the local application is a non-browser application and the local application is a non-browser embedded application, and the event includes closing of the local application.

2. The system of claim 1 wherein when the browser is frozen pursuant to the protocol logic, the browser remains alive in that the browser and the local application are capable of interacting with one another.

3. The system of claim 2, wherein when the browser is frozen pursuant to the protocol logic, a user is not allowed to interact with the browser directly.

4. The system of claim 1 wherein when the browser is frozen pursuant to the protocol logic, the browser is prevented from reacting to user-initiated events, and wherein the user-initiated events comprise one or more of a mouse click and a menu command.

5. The system of claim 1 wherein the protocol logic works with a plurality of application types, the local application belonging to one of the plurality of application types.

6. The system of claim 1, wherein a primary purpose of the local application is a word processor.

7. A system for maintaining consistent workflow, the system comprising:
   a processor; and
   a machine-readable storage medium including instructions that, when executed by the processor, cause the processor to implement a browser, a local application, and protocol logic, wherein the instructions further cause the protocol logic to:
      synchronize behavior among the browser, the local application and the server application by establishing a line of communication between the browser, the local application and the server application;
      upon detecting a first event with respect to the local application, freeze the browser until a second event with respect to the local application is detected; and
      utilize plurality of browser network parameters shared with a plurality of other protocols in order to ensure that the protocol logic is compatible with different network security devices, and wherein the elements are implemented by a computer
   wherein the local application is a non-browser application and the local application is a non-browser embedded application, and the second event includes closing of the local application.

8. The system of claim 7 wherein when the browser is frozen pursuant to the protocol logic, a browser session associated with the browser remains alive allowing the browser and the local application to interact with one another.

9. The system of claim 8, wherein when the browser is frozen pursuant to the protocol logic, a user is not allowed to interact with the browser directly.

10. The system of claim 7 wherein the first event includes opening of the local application.

11. The system of claim 7 wherein the protocol logic works with a plurality of browser types, the browser belonging to one of the plurality of browser types.

12. The system of claim 7 wherein the protocol logic works with a plurality of application types, the local application belonging to one of the plurality of browser types.

13. A method of maintaining consistent workflow between a browser and an application by a processor executing the browser and the application, the method comprising:
   activating the browser to establish a browser session;
   initiating launch of the application;
   establishing a line of communication between the browser and the application;
   upon detecting that the application is to be launched, freezing the browser until an event with respect to the application is detected; and
   using a plurality of browser network parameters shared with a plurality of other protocols to ensure compatibility with different network security devices;
   wherein the application is a non-browser application and the application is a non-browser embedded application and the event includes closing of the application.

14. The method of claim 13 wherein when the browser is frozen, the browser remains alive in that the browser and the application are capable of interacting with one another.

15. The method of claim 14, wherein when the browser is frozen, a user is not allowed to interact with the browser directly.

16. The method of claim 13, wherein the protocol works with a plurality of browser types, the browser belonging to one of the plurality of browser types.

17. The method of claim 13, wherein the protocol works with a plurality of application types, the application belonging to one of the plurality of browser types.

* * * * *